(12) United States Patent
Wobben

(10) Patent No.: US 7,288,851 B2
(45) Date of Patent: Oct. 30, 2007

(54) WIND POWER INSTALLATION WITH AN ASYNCHRONOUS MACHINE FOR ESTABLISHING THE AZIMUTH POSITION

(76) Inventor: Aloys Wobben, Argestrasse 19, Aurich (DE) 26607

( * ) Notice: Subject to any disclaimer, the term of this patent is extended or adjusted under 35 U.S.C. 154(b) by 0 days.

(21) Appl. No.: 11/669,874

(22) Filed: Jan. 31, 2007

(65) Prior Publication Data

US 2007/0120370 A1    May 31, 2007

Related U.S. Application Data

(63) Continuation of application No. 10/478,921, filed as application No. PCT/EP02/05888 on May 29, 2002, now Pat. No. 7,190,086.

(30) Foreign Application Priority Data

Jun. 2, 2001    (DE)    ................................ 101 27 102

(51) Int. Cl.
  *F03D 7/02*    (2006.01)
  *H02K 16/00*    (2006.01)
(52) U.S. Cl. .......................................... 290/44; 290/55
(58) Field of Classification Search .................... 280/55
  See application file for complete search history.

(56) References Cited

U.S. PATENT DOCUMENTS

| | | | |
|---|---|---|---|
| 3,223,862 A | 12/1965 | Webb | |
| 3,235,758 A | 2/1966 | Dinsmore | |
| 3,949,622 A | 4/1976 | Czabanski | |
| 4,305,030 A | 12/1981 | Lorenz | |
| 4,527,072 A | 7/1985 | van Degeer | |
| 4,692,094 A | 9/1987 | Kulinyak | |
| 4,728,840 A | 3/1988 | Newhouse | |
| 4,966,525 A | 10/1990 | Nielsen | |
| 5,035,575 A | 7/1991 | Nielsen et al. | |
| 5,051,639 A | 9/1991 | Satake et al. | |
| 5,422,826 A | 6/1995 | Cousineau | |
| 5,838,135 A | 11/1998 | Satake et al. | |
| 5,990,590 A | 11/1999 | Roesel, Jr. et al. | |
| 6,176,675 B1 | 1/2001 | Engstrom | |
| 6,429,562 B2 | 8/2002 | Nakano et al. | |
| 6,541,877 B2 | 4/2003 | Kim et al. | |
| 6,788,022 B2 | 9/2004 | Sopko et al. | |

(Continued)

FOREIGN PATENT DOCUMENTS

DE    1202395    10/1965

(Continued)

*Primary Examiner*—Joseph Waks
(74) *Attorney, Agent, or Firm*—Seed IP Law Group PLLC

(57) ABSTRACT

An asynchronous machine has a first rotor/stator arrangement in which the rotor is connected to a shaft, and a method of controlling such an asynchronous machine is provided. A drive is provided which permits nullification of the play of the mechanical components in the predetermined target position without involving mutual influencing as between the desired braking moment and elimination of the play. A suitable method of controlling a drive is provided. An asynchronous machine has a first rotor/stator arrangement in which the rotor is connected to a shaft, characterized by at least one second rotor/stator arrangement which however is electrically separated from the first rotor/stator arrangement, wherein the rotor of the second rotor/stator arrangement is also connected to the shaft.

11 Claims, 3 Drawing Sheets

U.S. PATENT DOCUMENTS

| | | | |
|---|---|---|---|
| 6,879,055 B2 | 4/2005 | Becker et al. | |
| 7,190,086 B2 * | 3/2007 | Wobben | 290/44 |
| 2001/0020805 A1 | 9/2001 | Nakano et al. | |
| 2004/0253093 A1 | 12/2004 | Shibata et al. | |
| 2005/0253396 A1 | 11/2005 | Mikhail et al. | |
| 2006/0006744 A1 | 1/2006 | Nashiki | |

FOREIGN PATENT DOCUMENTS

| | | |
|---|---|---|
| DE | 2136187 | 2/1973 |
| DE | 196 45 581 A1 | 8/1999 |
| DE | 199 20 504 A1 | 6/2000 |
| DE | 19955586 A1 | 6/2001 |
| EP | 0 945 613 A2 | 9/1999 |
| JP | 59-165978 | 9/1984 |
| JP | 6-311711 | 11/1994 |
| WO | WO 00/31413 A1 | 1/2007 |

* cited by examiner

WIND POWER INSTALLATION WITH AN ASYNCHRONOUS MACHINE FOR ESTABLISHING THE AZIMUTH POSITION

CROSS-REFERENCE TO RELATED APPLICATION

This application is a continuation that claims the benefit under 35 U.S.C. § 120 of U.S. patent application Ser. No. 10/478,921, filed May 13, 2004, now U.S. Pat. No. 7,190,086, which in turn is a U.S. National Stage application under 35 U.S.C. § 371 of International Patent Application No. PCT/EP02/05888, filed on May 29, 2002, which in turn claims priority from German Patent Application No. 101 27 102.6, filed Jun. 2, 2001, which applications are all incorporated herein by reference in their entireties.

TECHNICAL FIELD

The present invention concerns a wind power installation with an asynchronous machine for establishing the azimuth position of the machine casing of the wind power installation, wherein the asynchronous machine is equipped with a first rotor/stator arrangement in which the rotor is connected to a shaft.

BACKGROUND OF THE INVENTION

Asynchronous machines have long been generally known, for example from WO 98/40958, DE 32 34 673, WO 90/13937 and U.S. Pat. No. 5,838,135 and are used for many different drive and adjusting functions. In that respect one adjusting function is frequently displacement of a part of a machine from an initial position into a predeterminable new target position.

A situation of use, by way of example, is adjustment of the azimuth position in wind power installations. That adjustment of the azimuth position, namely orientation of the pod in the case of horizontal-axis installations, provides that the rotor of the installation can be caused to track the wind in order thus to be able to continuously generate electrical energy.

To implement that wind direction tracking procedure, the pod of such a wind power installation is supported rotatably and is displaced by way of at least one so-called azimuth motor. Such displacement is effected by a procedure whereby for example a drive gear pinion engages into a tooth arrangement at the top of the pylon and displaces the pod with respect to the top of the pylon, by actuation of the motor. The asynchronous machine is stopped when the desired azimuth position is reached.

It will be noted however that the azimuth position does not change upon every minor deviation in the wind direction. As a result, when slight changes in wind direction are involved, that means that the wind involves an inclined afflux flow in relation to the rotor, and that entails a resulting yaw moment about the vertical axis of the wind power installation at the pod. In order that this yaw moment does not result in an unwanted change in the azimuth position, the azimuth motors can be supplied with a direct current in order to produce a suitable braking moment.

Problems however still occur due to the mechanical components employed. Even with the highest degree of accuracy and the utmost care, it is impossible to avoid play between the gear ring at the top of the pylon and the drive pinions. When fluctuating yaw moments occur, that results in a corresponding movement of the pod within the range which that play allows.

SUMMARY OF THE INVENTION

One object of the present invention is to provide a drive for establishing the position of the machine casing of a wind power installation, wherein the drive makes it possible to nullify the play in the mechanical components in the predetermined target position without involving mutual influencing as between the desired braking moment and elimination of the play.

In that respect, the invention has realized that the problems lie less in the area of the slight deviation from the ideal azimuth position, but rather in the additional mechanical loading on the components, which in turn results in a reduction in the service life thereof.

A further object of the present invention is to provide a suitable method of controlling a drive according to the invention.

In accordance with the invention, that object is attained by a wind power installation having the features described in this specification. Advantageous developments are described in this specification.

In accordance with the invention the asynchronous machine as set forth in the opening part of this specification has a second rotor/stator arrangement which however is electrically separated from the first rotor/stator arrangement, the rotor of the second rotor/stator arrangement also being connected to the shaft. That means that one rotor/stator arrangement can be supplied with a direct current in the desired direction to produce a desired braking moment while the second rotor/stator arrangement is supplied with an alternating current which produces a torque in the direction of the revolving rotary field and thus causes actuation of the drive.

If now two drives according to the invention which act in opposite directions are used, then each of the drives can be so, adjusted, by the opposite direction of the torque, that it overcomes the range of the mechanical play. That provides that the mechanical play is eliminated.

Irrespective thereof the braking moment is maintained as the currents respectively act on different rotor/stator arrangements and are not superimposed in terms of their electrical effect. Mechanically, superimposition takes place on the shaft as both rotors are connected to the shaft.

In a preferred development of the invention, upon adjustment of a part of a machine, both rotor/stator arrangements of the drive are supplied with a first alternating current in-phase relationship. This provides that the moments occurring in the individual rotor/stator arrangements are added to form a higher total moment.

BRIEF DESCRIPTION OF THE DRAWINGS

Advantageous embodiments are described in this specification. The invention is described in greater detail hereinafter with reference to the drawings in which.

DETAILED DESCRIPTION OF THE INVENTION

Figure 1:
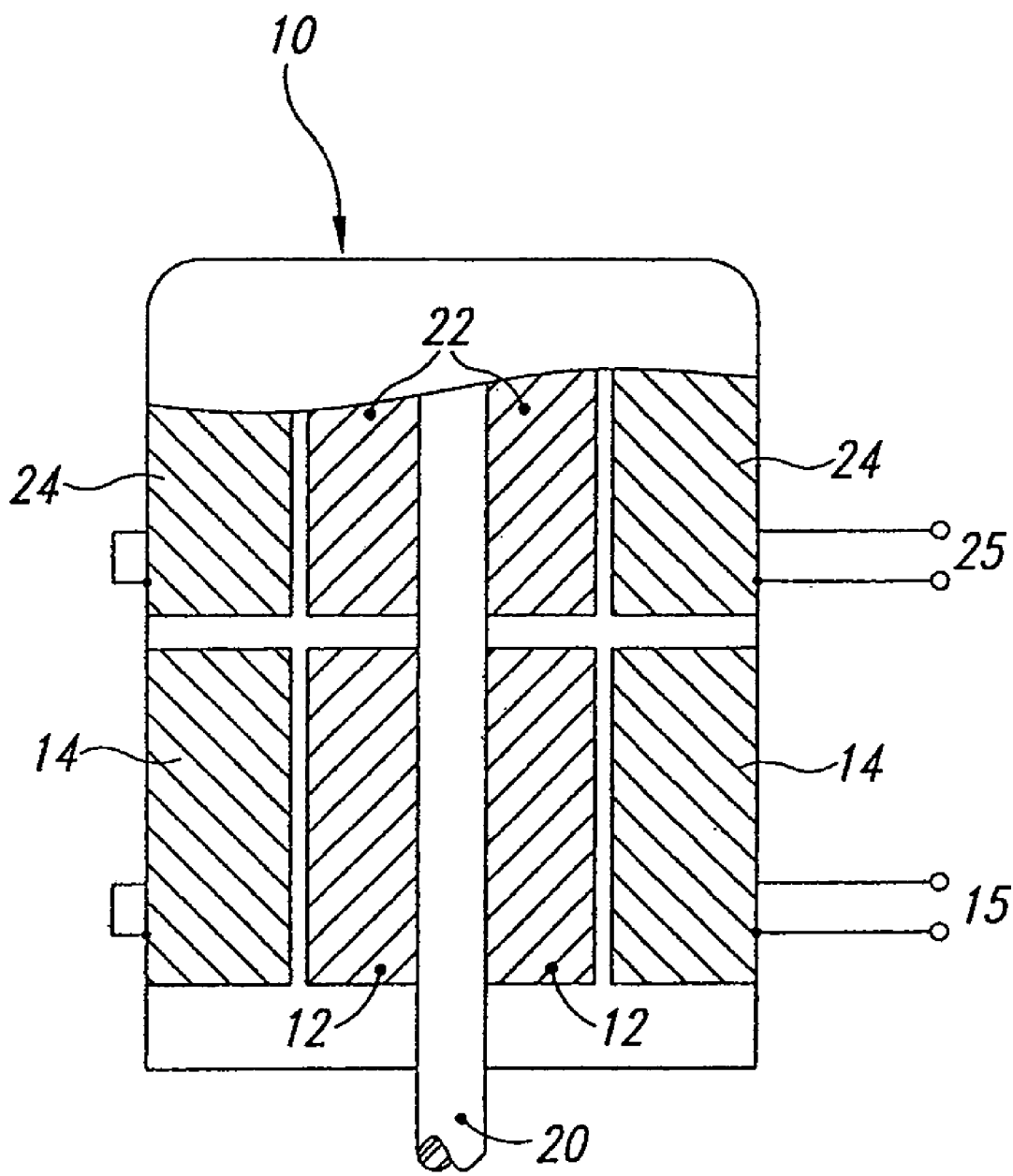
FIG. 1 is a partly sectional view of a drive according to the invention.

In FIG. 1 reference 10 denotes an azimuth drive having a drive motor 5 according to the invention. This drive motor 5 has a first rotor 12 which is connected to the shaft 20 and a first stator 14 which co-operates with the first rotor 12. The drive 10 according to the invention further has a second rotor 22 which is also connected to the shaft 20 and co-operates with the stator 24.

In this embodiment the two rotor/stator arrangements 12, 14; and 22, 24 are combined together in a housing but are electrically separated from each other. That is shown by the respective separately illustrated connecting terminals 15 and 25. Namely a first rotor 12 and first stator 14 constitute a first drive arrangement while a second rotor 22 and stator 24 constitute a second drive arrangement.

Figure 2:
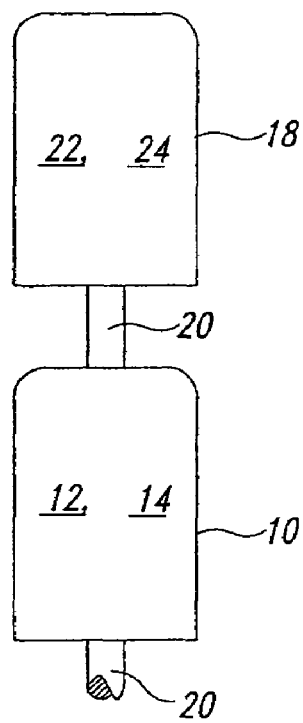
FIG. 2 shows an alternative embodiment of a drive according to the invention.

FIG. 2 shows a further embodiment of the present invention. In this embodiment the rotor/stator arrangements 12, 14; 22, 24 are each disposed in their own respective housing 10, 18. However, as in the embodiment shown in FIG. 1, both act on the same shaft 20 which passes through the housing 10 of the first rotor/stator arrangement 12, 14 and engages into the housing 18 of the second rotor/stator arrangement 22, 24 and is connected to both the rotors 12, 22.

Figure 3:
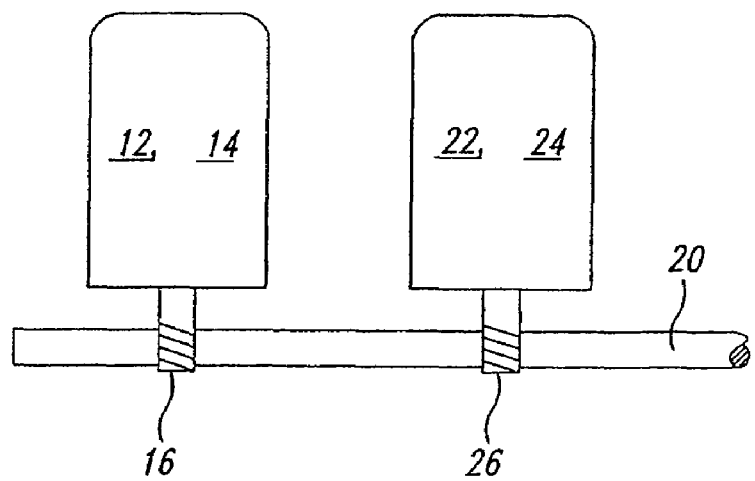
FIG. 3 shows a further embodiment of a drive according to the invention.

A further embodiment is shown in FIG. 3. In this case also the two rotor/stator arrangements 12, 14; 22, 24 are disposed in separate housings 10, 18. As a departure from the embodiments illustrated in FIGS. 1 and 2 however, in this embodiment both rotor/stator arrangements 12, 14; 22, 24 have their own machine shafts 16, 26 which in turn act on a common shaft 20.

This embodiment makes it possible in particular to use mechanically smaller components and allows relatively simple replacement of an individual component in the event of a fault.

Figure 4:
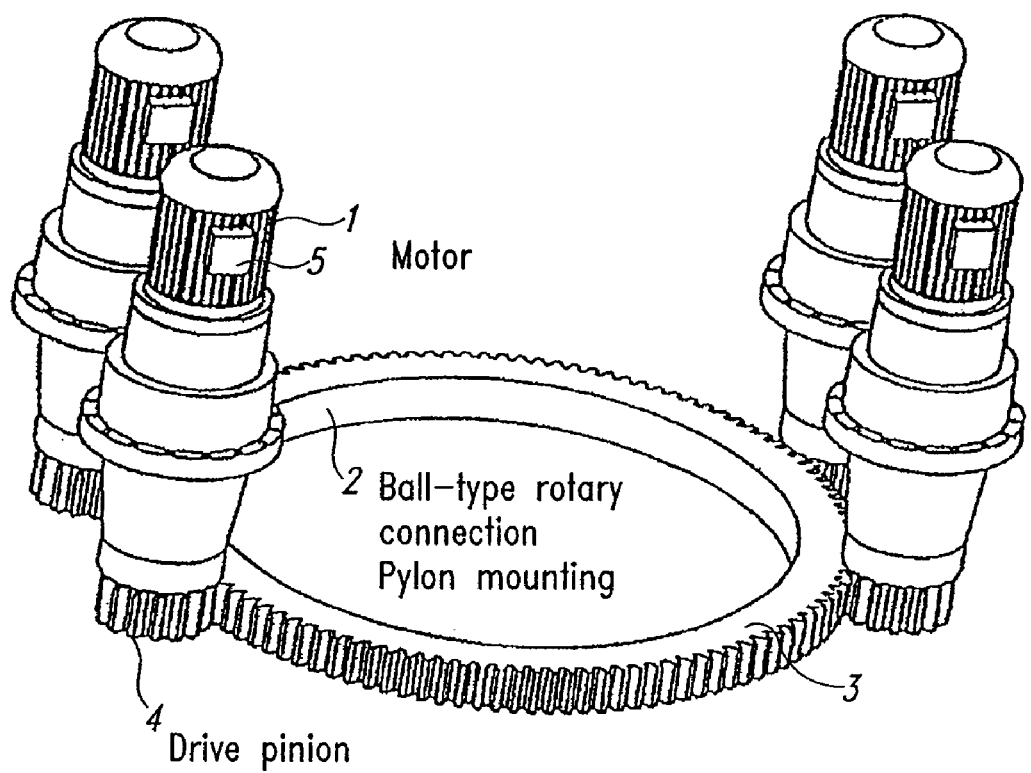
FIG. 4 shows a diagrammatic arrangement of four azimuth drives of an adjusting apparatus at the machine casing.

FIG. 4 shows a diagrammatic arrangement of four azimuth drives 10 of an adjusting apparatus at the machine casing of a wind power installation. Wind power installations generally have an active drive to provide the wind direction tracking action. The active drive rotates the top of the machine (machine casing) of the wind power installation in such a way that the rotor blades of the rotor of the installation are optimally oriented in the direction of the wind. The active drive for wind direction tracking is an azimuth drive 10 with the associated azimuth bearing 2 and is generally disposed between the top of the pylon and the machine casing of the wind power installation. In the case of small wind power installations a single azimuth drive 10 is sufficient, while larger wind power installations are generally equipped with a plurality of drives, for example four drives, as shown in FIG. 4. The four drives 10 are distributed uniformly around the periphery of the top 3 of the pylon (a non-uniform distribution is also possible).

In the present case asynchronous motors are used as the azimuth drives, as has already been described hereinbefore, with the shaft 20 (FIG. 1) acting directly on the drive pinion 4.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A wind power installation, comprising:
a shaft;
an installation rotor and a generator as well as a machine casing which accommodates the generator; and
an azimuth drive for azimuth adjustment of the machine casing, the azimuth drive being formed in an asynchronous machine, the asynchronous machine having a first rotor/stator arrangement, a rotor thereof being directly connected to the shaft, and the asynchronous machine further comprises at least one second rotor/stator arrangement which is electrically separated from the first rotor/stator arrangement, a rotor of the at least one second rotor/stator arrangement also being connected directly to the shaft, the drive permitting nullification of play of mechanical components in a target position.

2. The wind power installation according to claim 1 wherein the first rotor/stator arrangement is spatially separated from the at least one second rotor/stator arrangement.

3. The wind power installation according to claim 1, further comprising a common housing for the first rotor/stator arrangement and the at least one second rotor/stator arrangement.

4. The wind power installation according to claim 1, further comprising a housing for each of the rotor/stator arrangements.

5. The wind power installation according to claim 4 wherein the first rotor/stator arrangement and the second rotor/stator arrangement act with their own respective machine shaft on a common shaft.

6. A method of controlling an asynchronous machine according to claim 1 wherein the at least one second rotor/stator arrangement is acted upon by an alternating current and the first rotor/stator arrangement is acted upon by a direct current.

7. A wind power installation according to claim 1, further comprising at least another asynchronous machine, the two asynchronous machines forming the azimuth drive for azimuth adjustment.

8. Use of an asynchronous machine according to claim 1 as an apparatus for adjusting an azimuth position of a pod of the wind power installation.

9. The wind power installation according to claim 1 wherein the drive permits nullification of play in the mechanical components in the target position without involving mutual influencing as between a desired braking moment and elimination of the play.

10. The wind power installation according to claim 1 wherein said nullification of play includes use of said drive alone to eliminate said play.

11. A method of controlling an asynchronous machine as an azimuth drive in a wind power installation, wherein the asynchronous machine comprises a first and at least a second rotor/stator arrangement, wherein rotors of the first and the at least second rotor/stator arrangements are directly connected to a shaft, wherein the first rotor/stator arrangement is acted upon by an alternating current and the second rotor/stator arrangement is acted upon by a direct current, the drive permitting nullification of play of mechanical components in a target position.

* * * * *